(12) United States Patent
Hong

(10) Patent No.: US 12,550,137 B2
(45) Date of Patent: Feb. 10, 2026

(54) METHOD AND APPARATUS FOR TRANSMITTING UPLINK DATA

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 567 days.

(21) Appl. No.: 17/921,200

(22) PCT Filed: May 11, 2021

(86) PCT No.: PCT/KR2021/005868
§ 371 (c)(1),
(2) Date: Oct. 25, 2022

(87) PCT Pub. No.: WO2021/230614
PCT Pub. Date: Nov. 18, 2021

(65) Prior Publication Data
US 2023/0171765 A1  Jun. 1, 2023

(30) Foreign Application Priority Data

May 13, 2020 (KR) .................. 10-2020-0057243
May 13, 2020 (KR) .................. 10-2020-0057249
May 10, 2021 (KR) .................. 10-2021-0059786

(51) Int. Cl.
*H04W 72/23* (2023.01)
*H04L 1/08* (2006.01)
(Continued)

(52) U.S. Cl.
CPC ........... *H04W 72/1268* (2013.01); *H04L 1/08* (2013.01); *H04W 76/30* (2018.02)

(58) Field of Classification Search
CPC . H04W 72/1268; H04W 72/23; H04W 76/30; H04W 76/11; H04W 68/005; H04W 76/27; H04L 1/08
See application file for complete search history.

(56) References Cited

U.S. PATENT DOCUMENTS

2020/0107396 A1   4/2020  Wang et al.
2021/0204192 A1   7/2021  Lee et al.
(Continued)

FOREIGN PATENT DOCUMENTS

KR   10-2095177 B1    3/2020
WO   2020/032659 A1   2/2020
WO   2020/067749 A1   4/2020

OTHER PUBLICATIONS

Nokia et al., "Multiple configured grants per BWP for NR-U", R2-1913289, 3GPP TSG-RAN WG2 Meeting #107bis, Chongqing, China, Oct. 14-18, 2019.
(Continued)

*Primary Examiner* — Anez C Ebrahim
(74) *Attorney, Agent, or Firm* — IP Legal Services, LLC

(57) ABSTRACT

Provided are a method for a terminal to transmit uplink data, and an apparatus therefor. The method may include: transmitting, to a base station, help information for transmitting uplink data using a pre-configured uplink resource; receiving, from the base station, configuration information for transmitting the uplink data using the pre-configured uplink resource; and transmitting the uplink data through the pre-configured uplink resource on the basis of the configuration information.

13 Claims, 15 Drawing Sheets

(51) Int. Cl.
*H04W 72/1268* (2023.01)
*H04W 76/30* (2018.01)

(56) References Cited

U.S. PATENT DOCUMENTS

2021/0243814 A1* 8/2021 Zhang .............. H04W 74/0833
2021/0298108 A1 9/2021 Wu et al.

OTHER PUBLICATIONS

Huawei, "Report of email discussion [107#58][R16 NB-IoT/eMTC] RRC messages for D-PUR transmission and response", R2-1913931, 3GPP TSG-RAN WG2 Meeting#107bis, Chongqing, China, Oct. 14-18, 2019, pp. 1-25.

Huawei et al., "Discussion on RAN1 LS for D-PUR", R2-1906157, 3GPP TSG-RAN WG2 Meeting #106, Reno, Nevada, USA, May 13-17, 2019, pp. 1-3.

ZTE Corporation et al., "Remaining issues for D-PUR in IDLE", R2-1912896, 3GPP TSG-RAN WG2 #107bis, Chongqing, China, Oct. 14-18, 2019.

Gemalto N.V. et al., "Clarification on PUR release upon missing 'm' consecutive", R2-1913932, 3GPP TSG-RAN WG2 Meeting #107bis, Chongqing, China, Oct. 14-18, 2019, pp. 1-3.

Intel Corporation, "Additional issues in D-PUR in RRC_IDLE", R2-1909550, 3GPP TSG RAN WG2 Meeting #107, Prague, Czech Republic, Aug. 26 to 30, 2019.

Intel Corporation, "UL transmission in preconfigured resources for NB-IoT", R1-1906773, 3GPP TSG RAN WG1 Meeting #97, Reno, USA, May 13-17, 2019.

Asustek, "PUR configuration maintenance during RRC state transition", R2-2003653, 3GPP TSG-RAN WG2 Meeting #109bis-e, Electronic, Apr. 20-Apr. 30, 2020.

European Patent Office, Extended European Search Report of corresponding EP Patent Application No. 21803184.7, Mar. 13, 2024.

* cited by examiner

FIG. 13

UplinkConfigCommonSIB information element

```
-- ASN1 START
-- TAG-UPLINKCONFIGCOMMONSIB-START

UplinkConfigCommonSIB ::=          SEQUENCE {
    frequencyInfoUL                    FrequencyInfoUL-SIB,
    initialUplinkBWP                   BWP-UplinkCommon,
    timeAlignmentTimerCommon           TimeAligmentTimer
}

-- TAG-UPLINKCONFIGCOMMONSIB-STOP
-- ASN1 STOP
```

METHOD AND APPARATUS FOR TRANSMITTING UPLINK DATA

CROSS REFERENCE TO RELATED APPLICATIONS

This application is a National Stage patent application of PCT International Patent Application No. PCT/KR2021/005868 (filed on May 11, 2021) under 35 U.S.C. § 371, which claims priority to Korean Patent Application Nos. 10-2020-0057249 (filed on May 13, 2020), 10-2020-0057243 (filed on May 13, 2020), and 10-2021-0059786 (filed on May 10, 2021), the teachings of which are incorporated herein in their entireties by reference.

TECHNICAL FIELD

The disclosure relates to a method and device for transmitting uplink data by a UE.

BACKGROUND ART

There is demand for developing technology for processing a large amount of data at a high speed for providing various services using wireless terminals in vehicles and industrial sites. Further, it is required to develop a technology for a communication system capable of processing various scenarios and large-volume data, such as video, wireless data, and machine-type communication data, beyond a simple voice-oriented service. To this end, the international telecommunication union radio communication sector (ITU-R) introduces the requirements for adopting the international mobile telecommunication (IMT)-2020 international standard, and many studies have been conducted for advancing next-generation wireless communication technology to meet the requirements of IMT-2020.

In particular, the $3^{rd}$ generation partnership project (3GPP) is conducting research on the long term evolution (LTE)-advanced Pro Rel-15/16 standards and the new radio access technology (NR) standard in parallel to meet the requirements for IMT-2020 called $5^{th}$ generation (5G) technology, and 3GPP has a plan to approve the two standards as next-generation wireless communication technology.

Meanwhile, 5G technology requires instantaneous data transmission/reception techniques between the UE and the base station to meet the lower latency requirements. In other words, when the UE needs to transmit uplink data as in the related art, a scheduling request is transmitted to the base station, and the base station accordingly allocates an uplink resource to the UE. Due to such operation, it may be difficult to meet the latency requirements.

Accordingly, there is a need to simplify the procedure required for the UE to transmit uplink data.

DETAILED DESCRIPTION OF THE INVENTION

Technical Problem

The disclosure introduces a method and device for enabling a UE to transmit uplink data faster.

Technical Solution

In an aspect, a method may be provided for transmitting uplink data by a UE. The method may include transmitting, to a base station, assistance information for transmitting the uplink data using a preconfigured uplink resource, receiving, from the base station, configuration information for transmitting the uplink data using the preconfigured uplink resource, and transmitting the uplink data through the preconfigured uplink resource set based on the configuration information.

In another aspect, a method may be provided for controlling transmission of uplink data of a UE by a base station. The method may include receiving, from the UE, assistance information for transmitting the uplink data using a preconfigured uplink resource, transmitting, to the UE, configuration information for transmitting the uplink data using the preconfigured uplink resource, based on the assistance information, and receiving, from the UE, the uplink data through the preconfigured uplink resource set based on the configuration information.

In still another aspect, a UE may be provided for transmitting uplink data. The UE may include a transmitter configured to transmit, to a base station, assistance information for transmitting the uplink data using a preconfigured uplink resource and a receiver configured to receive, from the base station, configuration information for transmitting the uplink data using the preconfigured uplink resource, wherein the transmitter transmits the uplink data through the preconfigured uplink resource set based on the configuration information.

In yet still another aspect, a base station may be provided for controlling transmission of uplink data of a UE. The base station may include a receiver configured to receive, from the UE, assistance information for transmitting uplink data using a preconfigured uplink resource and a transmitter configured to transmit, to the UE, configuration information for transmitting the uplink data using the preconfigured uplink resource based on the assistance information, wherein the receiver further receives the uplink data through the preconfigured uplink resource set based on the configuration information from the UE.

Advantageous Effects

According to embodiments described in the disclosure, the UE may transmit uplink data faster.

BRIEF DESCRIPTION OF THE DRAWINGS

FIG. 13 is a view illustrating an uplink common configuration information element included in SIB1 according to the present embodiment;

MODE FOR CARRYING OUT THE INVENTION

Figure 1:
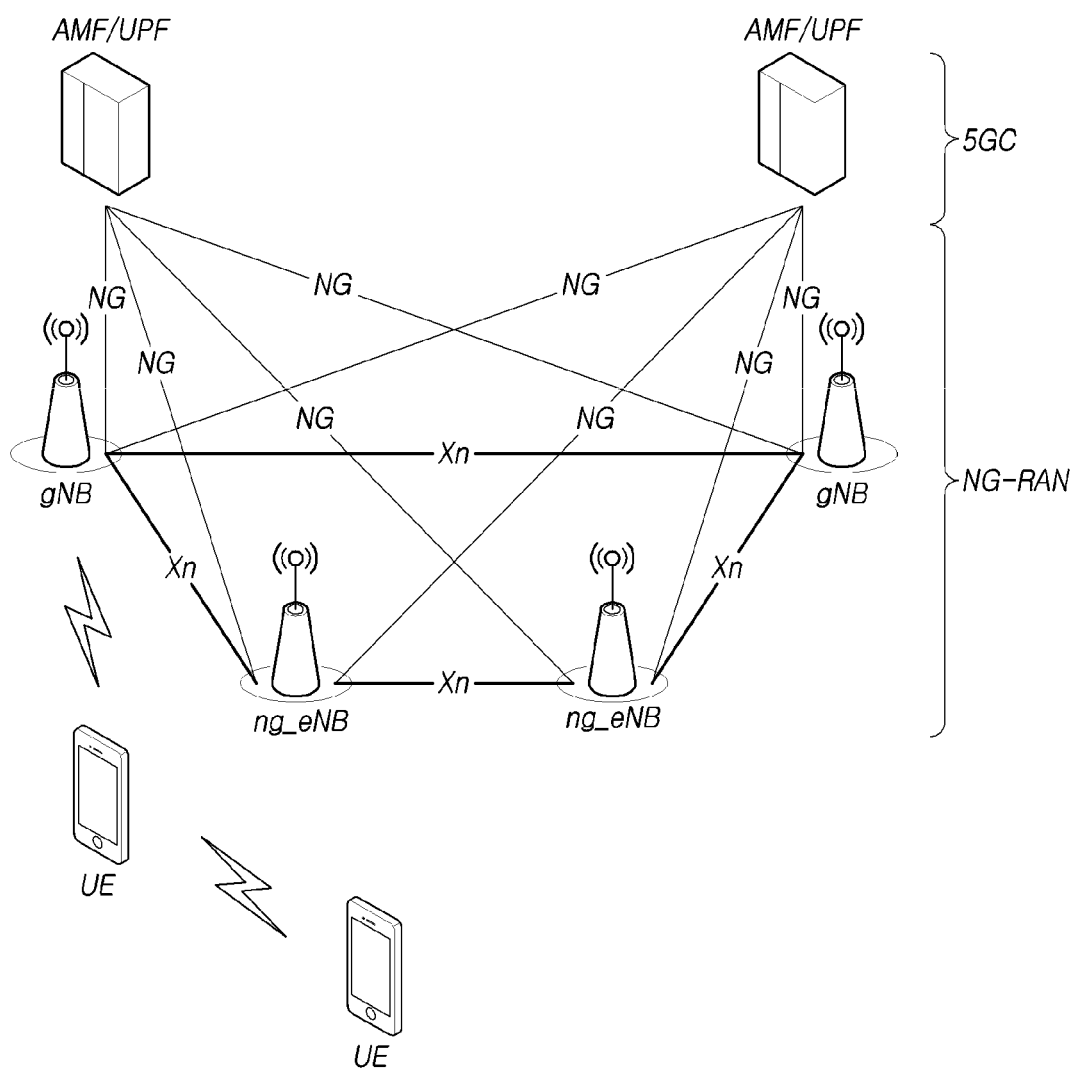
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols.

Figure 2:
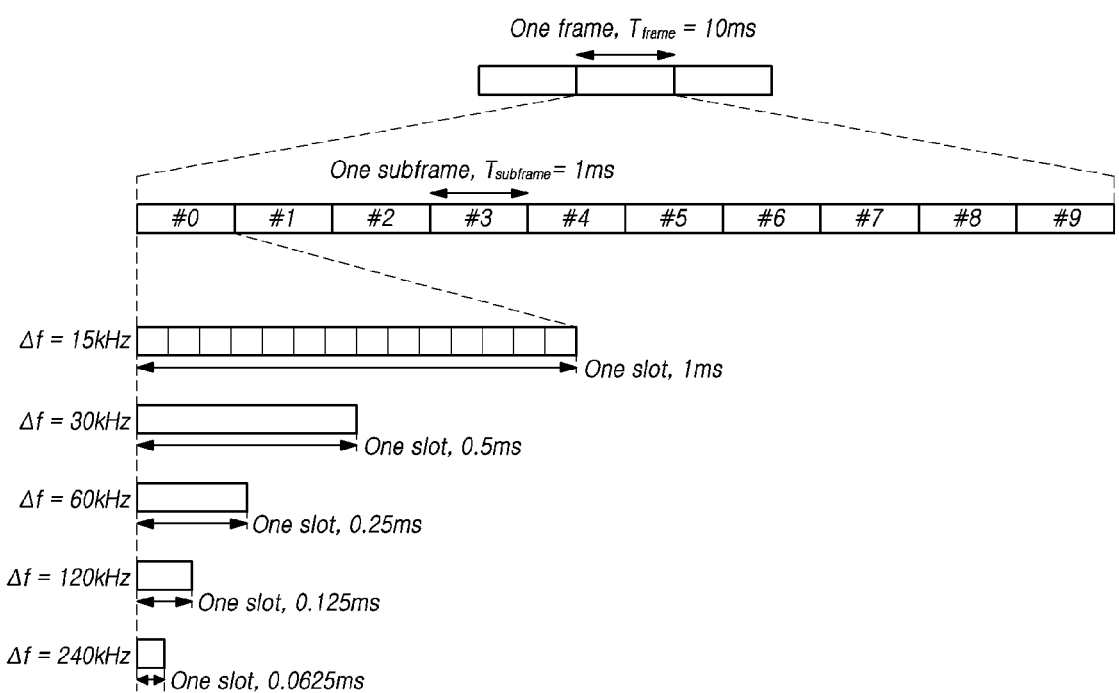
FIG. 2 is a view schematically illustrating a frame structure in an NR system in accordance with embodiments of the present disclosure.

FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
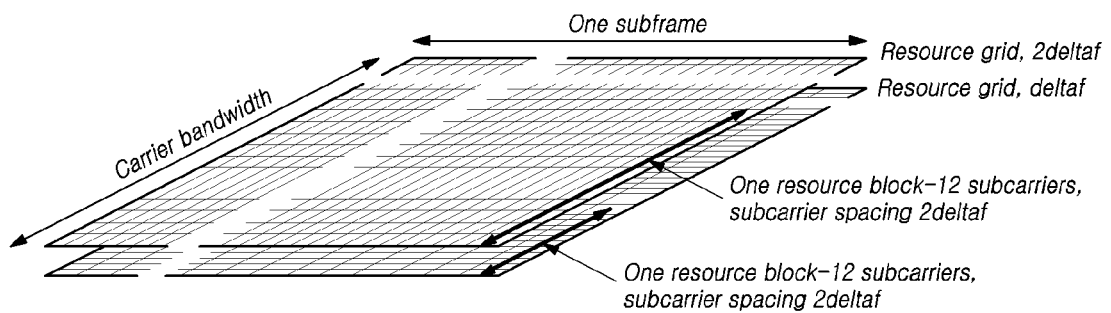
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
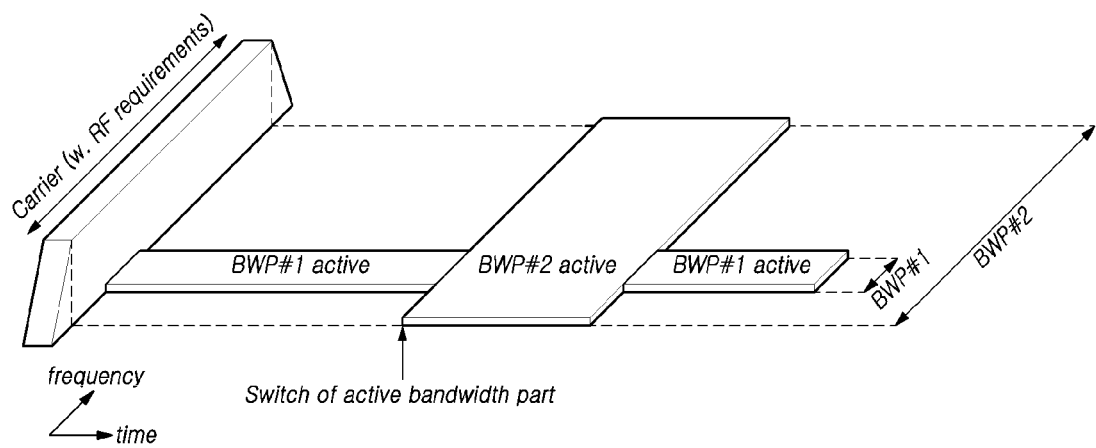
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
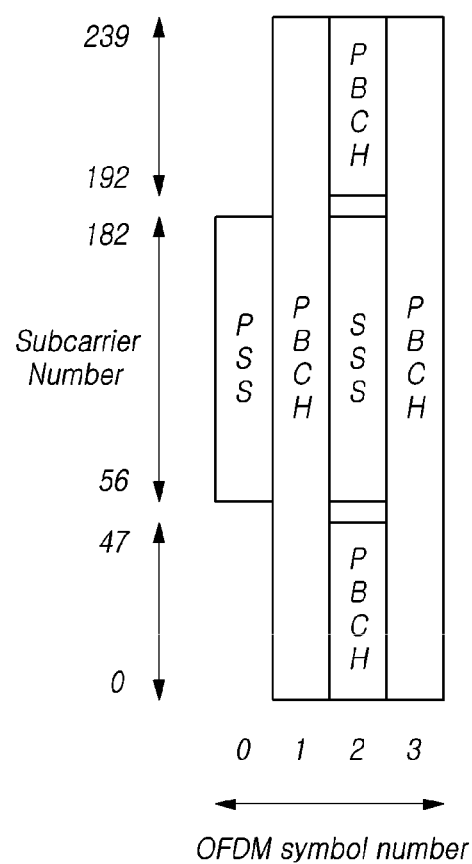
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORE-SET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
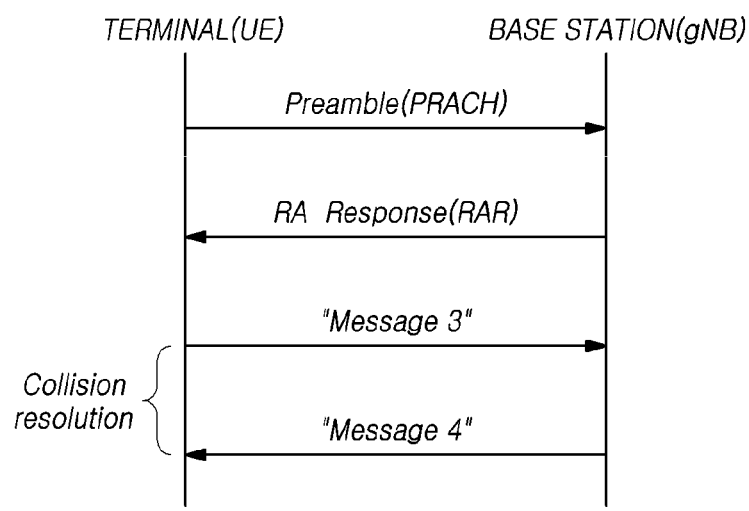
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR Coreset>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
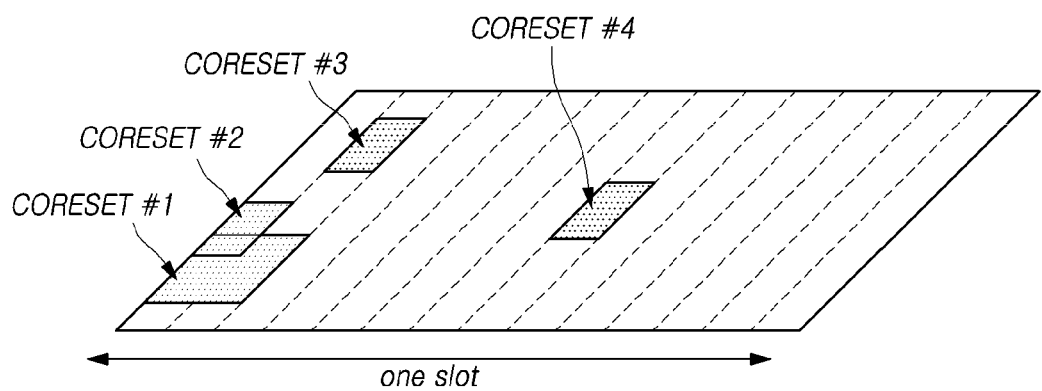
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

NR is designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra-reliable and low latency communication (URLLC) are defined as representative usage scenarios of NR. To meet requirements for each usage scenario, NR to have a more flexible frame structure as compared to the LTE/LTE-Advanced. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on time division multiplexing (TDM), frequency division multiplexing (FDM) or TDM/FDM over one NR carrier, and ii) methods of supporting one or more time units in configuring a scheduling unit in the time domain. In this regard, in NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like LTE. Therefore, the subframe of the NR has the time duration of 1 ms. Unlike LTE, since the subframe of NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation. Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot may be defined to be made up of fewer OFDM symbols than the slot. Thus, the scheduling for the latency critical data, such as the URLLC, may be performed based on the mini-slot.

Meanwhile, in NR, the default scheduling unit has been changed to a slot. Further, regardless of subcarrier-spacing, the slot consists of 14 OFDM symbols. In contrast, NR supports a non-slot structure configured of 2, 4, or 7 OFDM symbols, which is a smaller scheduling unit. The non-slot structure may be utilized as a scheduling unit for URLLC service.

Data Transmission Technology Using LTE-Based Preconfigured Uplink Resource (PUR)

3GPP has been standardizing transmission specifications using the preconfigured uplink resource (PUR) performing one uplink transmission in the RRC idle state using a preconfigured uplink resource without performing a random access procedure on the LTE radio access specifications. However, the transmission technology using LTE-based standardized preconfigured uplink resource may be used only over LTE radio access networks, and it was not applicable to all types of UEs. In other words, transmission using LTE-based preconfigured uplink resources were limited to bandwidth-limited low-complexity UEs, LTE-based MTC UEs such as UEs providing expanded coverage, and NB-IoT UEs (Transmission using PUR is only applicable to BL (Bandwidth reduced Low complexity) UEs, UEs in enhanced coverage and NB-IoT UEs). Further, the UE was able to transmit data using the technology only in the RRC idle state. Further, in the transmission technology, when the UE failed to transmit the preconfigured resource, the UE was able to perform retransmission only through the PDCCH indicated by the base station.

As such, the transmission technology using the preconfigured uplink resource may be available only on LTE radio access networks, and applicable UEs are limited to LTE-based MTC UEs and NB-IoT UEs. Further, it was able to be applied only to UEs in the RRC idle state. Accordingly, it was impossible to apply transmission through the preconfigured uplink resource in association with added functions on the NR radio access network, such as bandwidth part operation. Further, transmission using the preconfigured uplink resource provided no separate access control because it considered application to LTE-based MTC UEs and NB-IoT UEs. There is also proposed a method and device capable of efficient retransmission when a corresponding transmission fails.

To address such issues, the present disclosure introduces a method and device for controlling to perform efficient transmission/reception of data using the bandwidth part over a preconfigured uplink (e.g., PUSCH) resource by a UE in the RRC inactive state (or UE in the RRC idle state) over an NR radio access network.

Hereinafter, a transmission method using an NR radio access technology-based preconfigured uplink resource will be described. However, this is for convenience of description, and the embodiments may be applied to any radio access technology. For convenience of description, transmission technology using the NR radio access technology-based preconfigured uplink/PUSCH resource (or transmission technology in which the RRC inactive UE does not perform a random access procedure but performs one uplink transmission using a preconfigured uplink resource) may be denoted and described as a NR-based resource conflict PUSCH resource (NPUR). However, the embodiments are not limited thereto. It may be replaced with another term.

In the disclosure, uplink data transmission using the preconfigured uplink resource means a scheme that enables UE to immediately perform transmission using a preconfigured uplink resource, rather than being assigned a radio resource by a base station when the UE needs uplink data transmission. For example, in the related art, the uplink data transmission procedure was performed by UE's scheduling request, a base station's uplink radio resource allocation, and uplink data transmission using the allocated uplink radio resource. In contrast, according to embodiments, a UE previously receives a preconfigured uplink resource from a base station and configures it and, if uplink data transmission is triggered, uplink data is immediately transmitted using the corresponding preconfigured uplink resource. This may be expressed by various terms, such as grant-free transmission, but there is no limitation to the term.

Meanwhile, the disclosure includes the content of information elements and operations set forth in TS 38.321, the 3GPP NR MAC standard, and TS 38.331, the NR RRC standard. Although the disclosure does not contain the content of the UE operation related to the definitions for the corresponding information elements, the content set forth in the communication standards may constitute the present embodiments. For convenience of description, an NPUR method by the UE in the RRC inactive state specified in NR will be described, hereinafter. However, the embodiments are not limited thereto. For example, the NPUR method may be applied to the UE in the RRC idle state.

Hereinafter, operations of a UE and a base station according to an embodiment will be described.

Figure 8:
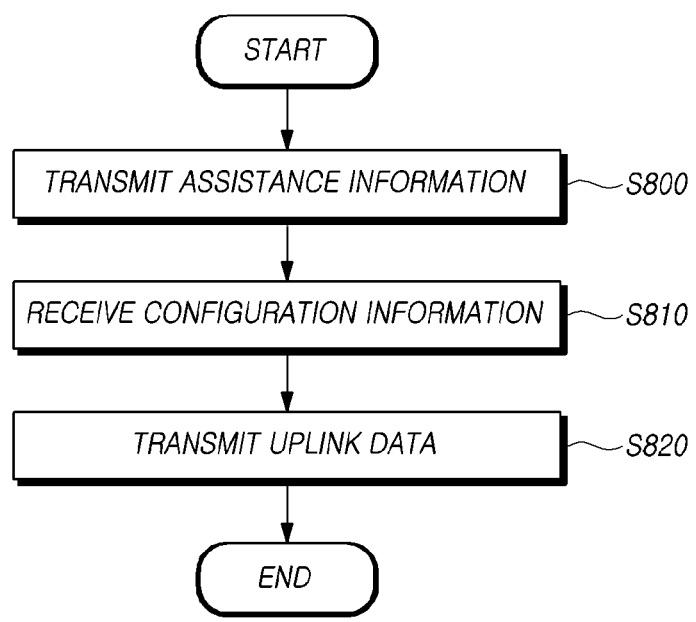
FIG. 8 is a flowchart for describing operations of a UE according to an embodiment.
Figure 9:
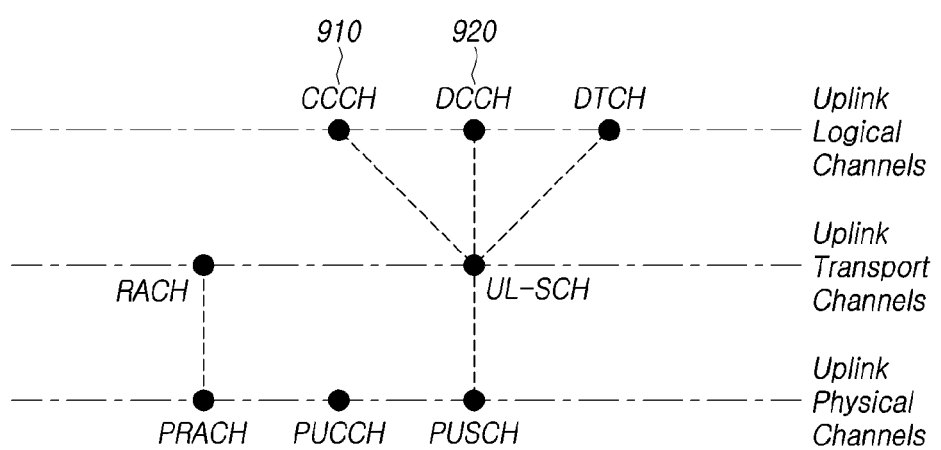
FIG. 9 is a view illustrating a mapping structure between a logical channel and a transport channel according to an embodiment.

FIG. 8 is a flowchart for describing operations of a UE according to an embodiment. FIG. 9 is a view illustrating a mapping structure between a logical channel and a transport channel according to an embodiment.

Referring to FIG. 8, a UE transmitting uplink data may perform a step of transmitting, to a base station, assistance information for transmitting uplink data using a preconfigured uplink resource (S800).

According to an embodiment, the assistance information may include various information requested by the UE in transmitting uplink data using the preconfigured uplink resource. As an example, the assistance information may include information, such as the number of request occasions, request cycle, request transport block size (TBS), and request time offset. The assistance information may be transmitted to the base station through an RRC message or MSGA or MSG3 transmitted during a random access procedure.

The assistance information may be indicated by different logical channels according to the RRC state of the UE. For example, the assistance information may be indicated through a transport channel by different logical channels according to the RRC state of the UE. For example, when the UE is in the RRC IDLE state or RRC INACTIVE state, assistance information may be indicated through a common control channel (CCCH). As another example, when the UE is in the RRC connected state, the assistance information may be indicated through a dedicated control channel (DCCH).

Referring to FIG. 9, for uplink transmission, a logical channel is mapped to each transport channel, and the transport channel is mapped to a physical channel. As described above, when the UE is in RRC idle or RRC inactive state, assistance information may be indicated to the base station by the CCCH 910. The CCCH 910 is mapped to the UL-SCH of the transport channel, and the UL-SCH is mapped to the PUSCH of the physical channel. When the UE is in the RRC connected state, the UE indicates the assistance information to the transport channel through the DCCH 920, and the UL-SCH transport channel indicates the assistance information to the base station through the PUSCH physical channel.

The UE may perform a step of receiving, from the base station, configuration information for transmitting uplink data using the preconfigured uplink resource (S810).

According to an embodiment, the configuration information may be received through a dedicated RRC message. As an example, the configuration information may be included and received in an RRC release message. Or, the configuration information may be included and received in an RRC reconfiguration message.

The configuration information may include parameters necessary for the UE to transmit uplink data using the preconfigured uplink resource. For example, the configuration information may include various pieces of information, such as preconfigured uplink radio resource (frequency, time resource) information, UE-specific RNTI information, uplink data transmission trigger condition information using the preconfigured uplink resource, and bandwidth part information.

Meanwhile, the configuration information may be set in association with the bandwidth part. For example, the bandwidth part where the preconfigured uplink resource is set may be set as a dedicated bandwidth part differentiated from the initial uplink bandwidth part set in the UE. Or, the bandwidth part associated with the preconfigured uplink resource may be an initial uplink bandwidth part set in the UE. The bandwidth part where the preconfigured uplink resource is set may be indicated to the UE through an RRC release message.

The UE may perform a step of transmitting uplink data through the preconfigured uplink resource set based on the configuration information (S820).

For example, if uplink transmission is triggered with the preconfigured uplink resource configured in the UE, the UE may transmit uplink data to the base station using the configured preconfigured uplink resource.

According to an embodiment, whether to transmit uplink data using the preconfigured uplink resource may be determined based on condition information that may be included in the above-described configuration information. As an example, when uplink data is transmitted using the preconfigured uplink resource, transmission of the buffer status information (BSR) may be set not to be triggered. A specific embodiment related to the BSR trigger is described again below.

Figure 10:
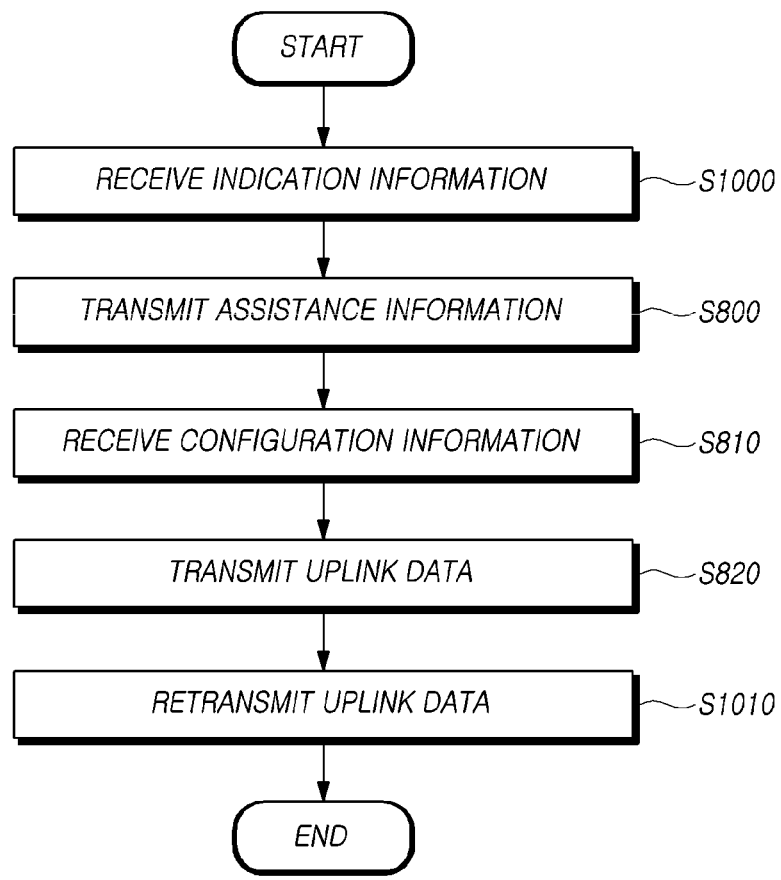
FIG. 10 is a flowchart for describing operations of a UE according to another embodiment.

FIG. 10 is a flowchart for describing operations of a UE according to another embodiment.

Referring to FIG. 10, the UE may further perform a step of receiving, through system information, indication information indicating whether to allow transmission of assistance information before a step of transmitting assistance information to a base station (S1000).

According to an embodiment, the UE may receive, through the system information, the indication information indicating whether transmission of the assistance information for using the preconfigured uplink resource is allowed. The indication information may include information for controlling/limiting the UE's interest/assistance/subscription information for configuring the preconfigured uplink resource.

For example, the indication information may include information for indicating that the UE allows transmission of the interest/assistance/subscription information in a specific cell. As another example, the indication information may include information about whether to support/allow transmission using the preconfigured uplink resource in the specific cell. As another example, the indication information may include a timer value for prohibiting transmission using the preconfigured uplink resource. Further, the indication information may include other various pieces of information, and more detailed embodiments are described below.

The indication information may be received through system information, e.g., SIB1, or through a dedicated RRC message.

Since steps S800 to S820 are already described above, the same descriptions thereof are omitted herein.

Upon failing to receive an acknowledge signal for the uplink data from the base station before the step of transmitting the uplink data, the UE may further perform a step of retransmitting uplink data (S1010).

Here, failure to receive an acknowledge signal for the uplink data using the preconfigured uplink resource from the base station may include receiving a feedback signal as an NACK, as well as receiving no ACK/NACK signal.

For example, upon failing to receive an ACK signal from the base station when transmitting the uplink data using the preconfigured uplink resource, the UE may be able to perform retransmission. In this case, retransmission of uplink data may be performed on the next preconfigured uplink resource occasion on the time axis. In other words, retransmission may be performed on the next preconfigured uplink resource occasion of the preconfigured uplink resource.

Through the above-described operations, the RRC inactive UE or RRC idle UE may immediately transmit uplink data without performing a complicated procedure for RRC connection using the preconfigured uplink resource. Thus, it is possible to normally provide a latency critical service, such as vehicle communication according to the embodiments.

Figure 11:
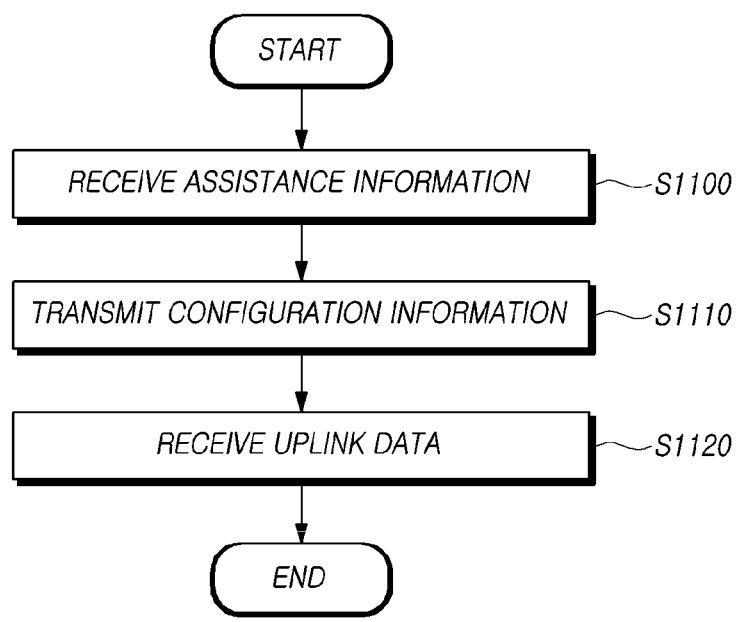
FIG. 11 is a flowchart for describing operations of a base station according to an embodiment.

FIG. 11 is a flowchart for describing operations of a base station according to an embodiment.

Referring to FIG. 11, the base station controlling UE's uplink data transmission may perform a step of receiving, from a UE, assistance information for transmitting uplink data using preconfigured uplink resource (S1100).

According to an embodiment, the assistance information may include various information requested by the UE in transmitting uplink data using the preconfigured uplink resource. As an example, the assistance information may include information, such as the number of request occasions, request cycle, request TBS, and request time offset. The assistance information may be received through an RRC message or MSGA or MSG3 received during a random access procedure.

The assistance information may be indicated through different logical channels according to the RRC state of the UE. For example, the assistance information may be indicated through a transport channel by different logical channels according to the RRC state of the UE. For example, when the UE is in the RRC IDLE state or RRC INACTIVE state, assistance information may be indicated through a common control channel (CCCH). As another example, when the UE is in the RRC connected state, the assistance information may be indicated through a dedicated control channel (DCCH).

The base station may perform a step of transmitting, to the UE, configuration information for transmitting uplink data using the preconfigured uplink resource (S1110).

According to an embodiment, the configuration information may be transmitted through a dedicated RRC message. As an example, the configuration information may be included and transmitted in an RRC release message. Or, the configuration information may be included and transmitted in an RRC reconfiguration message.

The configuration information may include parameters necessary for the UE to transmit uplink data using the preconfigured uplink resource. For example, the configuration information may include various pieces of information, such as preconfigured uplink radio resource (frequency, time resource) information, UE-specific RNTI information, uplink data transmission trigger condition information using the preconfigured uplink resource, and bandwidth part information.

Meanwhile, the configuration information may be set in association with the bandwidth part. For example, the bandwidth part where the preconfigured uplink resource is set may be set as a dedicated bandwidth part differentiated from the initial uplink bandwidth part set in the UE. Or, the bandwidth part associated with the preconfigured uplink resource may be an initial uplink bandwidth part set in the UE. The bandwidth part where the preconfigured uplink resource is set may be indicated to the UE through an RRC release message.

The base station may perform a step of receiving, from the UE, uplink data through the preconfigured uplink resource set based on the configuration information (S1120).

For example, if uplink transmission is triggered with the preconfigured uplink resource configured in the UE, the UE may transmit uplink data to the base station using the configured preconfigured uplink resource. In this case, the base station may receive, from the UE, uplink data through the preconfigured uplink resource set in each UE.

Figure 12:
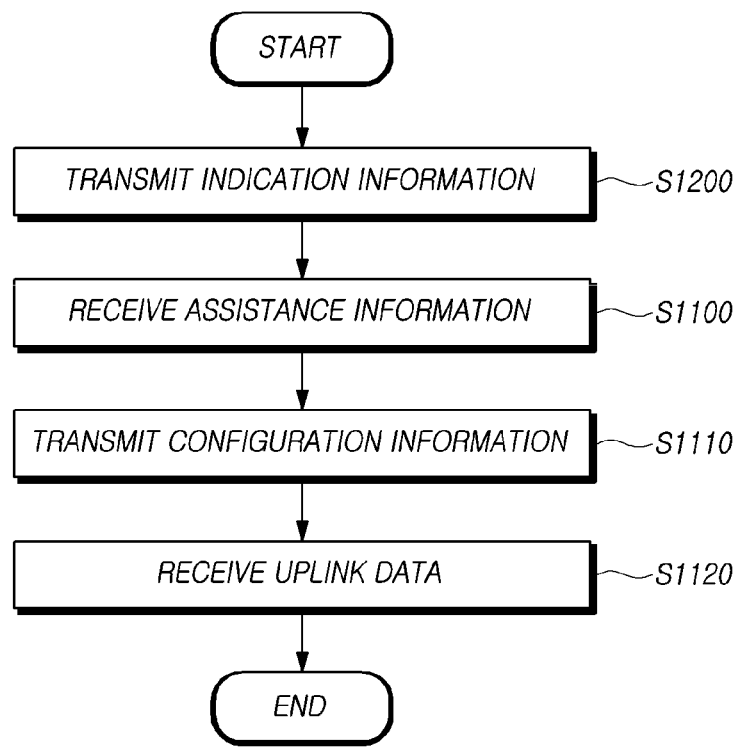
FIG. 12 is a flowchart for describing operations of a base station according to another embodiment.

FIG. 12 is a flowchart for describing operations of a base station according to another embodiment.

Referring to FIG. 12, the base station may further perform a step of transmitting, through system information, indication information indicating whether to allow transmission of assistance information before the step of receiving the assistance information (S1200).

According to an embodiment, the base station may transmit, through the system information to the UE, the indication information indicating whether transmission of the assistance information for using the preconfigured uplink resource is allowed. The indication information may include information for controlling/limiting the UE's interest/assistance/subscription information for configuring the preconfigured uplink resource.

As an example, the indication information may include information for indicating that the UE allows transmission of the interest/assistance/subscription information in a specific cell. As another example, the indication information may include information about whether to support/allow transmission using the preconfigured uplink resource in the specific cell. As another example, the indication information may include a timer value for prohibiting transmission using the preconfigured uplink resource. Further, the indication information may include other various pieces of information, and more detailed embodiments are described below.

The indication information may be transmitted through system information, e.g., SIB1, or through a dedicated RRC message. Since steps S1100 to S1120 are already described above, the same descriptions thereof are omitted herein.

Further, upon receiving uplink data through the preconfigured uplink resource, the base station may transmit feedback information therefor to the UE. Further, upon receiving no feedback information or feedback information indicated as NACK, the UE may retransmit uplink data.

Through the above-described operations according to the embodiments, the base station may quickly receive the UE's latency critical data.

Hereinafter, embodiments in the above-described UE and base station operations will be separately described in greater detail. The embodiments described below may be performed individually or in combination by the above-described UE and base station.

Any LTE operator could configure a minimum bandwidth of 1.4 MHz to a maximum of 20 MHz in configuring one LTE component carrier (CC). The typical LTE UE supported transmission/reception capability of 20 MHz bandwidth for one LTE CC. Unlike LTE in which the carrier bandwidth is limited to 20 MHz, in NR, the maximum carrier bandwidth may be set from 50 MHz to 400 MHz for each subcarrier interval. Accordingly, in NR, to efficiently use a carrier bandwidth while reducing power consumption of the UE, the base station may designate and use a bandwidth part (BWP) to the UE. Up to four bandwidth parts may be configured in the NR UE for each of uplink and downlink. Data may be transmitted/received using one active (activated) bandwidth part at a given time.

In the case of a cell configured through unpaired spectra, DL/UL BWPs of the same ID were associated, and the DL/UL BWPs of the same ID were defined to share a center frequency. In other words, in the case of unpaired spectra, BWP configuration and activation in the form of a DL/UL BWP pair are supported. On the other hand, in the case of paired spectra, association between DL/UL BWPs is not defined, and each DL/UL BWP may be independently configured, activated, and used. To support transmission using a preconfiguration in NR, a configuration considering the BWP of NR needs to be supported. Further, the base station needs to control transmission using the preconfiguration in NR to efficiently and stably utilize radio resources.

Hereinafter, a providing method will be first described. Hereinafter, the above-described preconfigured uplink resource may be described as a preconfigured resource or NPUR.

An Embodiment in which a Base Station Indicates Configuration Information for Transmission Using NPUR in Association with BWP A NPUR may basically correspond to a UE-specific configuration. This is because for a specific UE, a preconfigured uplink resource to transmit data in the RRC inactive state is configured in the corresponding cell. Accordingly, the configuration information may basically allow for use of an RRC dedicated message (e.g., RRC release message). Or, the base station may modify/reconfigure configuration parameters for transmission/retransmission using the preconfigured resource using the RRC reconfiguration message.

Meanwhile, the configuration information for transmission using NPUR may be indicated in association with the BWP. Or, the BWP supporting transmission using NPUR may be separately indicated.

To configure the UE in the RRC connected state, the base station could configure up to four DL/UL BWPs in the UE for one serving cell through an RRC reconfiguration message. For initial access, and until (re) configuration of the UE is received in the cell, the initial BWP discovered from the system information could be used.

FIG. 13 is a view illustrating an uplink common configuration information element included in SIB1 according to an embodiment.

Referring to FIG. 13, the uplink common configuration information elements included in SIB1 include uplink frequency information (frequencyInfoUL), initial uplink BWP (initialUplinkBWP), and timing alignment timer common information (timeAlignmentTimerCommon).

When receiving RRC (re) configuration, the UE uses a first active BWP indicated by the base station, as an active BWP. For example, the UE may use an initial BWP before receiving an RRC reconfiguration message. The base station may modify UE's RRC connection configuration through the RRC reconfiguration message to an RRC connected UE. The base station may configure UE-specific BWPs on the serving cell/PCell/special cell through the RRC reconfiguration message. The RRC connected UE uses the first active BWP included in the RRC reconfiguration message as the active BWP. In the RRC connected state, the base station and the UE may efficiently transmit/receive data through BWP switching.

Meanwhile, the base station may indicate (e.g., instruct), to the UE, the BWP supporting transmission using the preconfigured resource in the RRC inactive state in the cell. Upon receiving the corresponding information, the UE may store configuration information including BWP information supporting transmission using preconfigured resources. The UE may configure the MAC according to the stored configuration.

For example, transmission using a preconfigured resource may be configured in association with the initial uplink BWP. The base station may indicate (e.g., instruct), to the UE, the preconfigured resource/resource pool for transmission using the preconfigured resource/resource pool by associating/including it in the initial uplink BWP configuration information indicated through the system information in the cell. Or, the base station may include and transmit the initial uplink BWP configuration information in an RRC release message. The preconfigured resource/resource pool for transmission using the preconfigured resource/resource pool may be indicated to the UE, by associating/including in the initial uplink BWP configuration information.

According to an embodiment, the above-described configuration information indicating the preconfigured resource/resource pool may be cell-specifically indicated to allow a plurality of UEs to select a corresponding preconfigured resource/resource pool to perform uplink transmission. In this case, a collision may occur according to contention. When the UE is in the RRC connected state in the cell, the base station may indicate (e.g., instruct), to the UE through an RRC dedicated message (e.g., RRC release message), a UE-specific RNTI (hereinafter, referred to as NPUR-RNTI for convenience of description) for transmission using the preconfigured resource. The UE may include and transmit the NPUR-RNTI in uplink transmission. Or, the UE may scramble/address uplink data through the NPUR-RNTI and transmit it. Or, the base station may scramble/address, through the NPUR-RNTI, a scheduling grant for uplink transmission/retransmission following the transmission using the preconfigured resource. Or, the base station may scramble/address, through the NPUR-RNTI, a scheduling grant for downlink transmission/retransmission following the transmission using the preconfigured resource. The base station may be set to identify what UE has transmitted the uplink data transmitted using a specific preconfigured resource. Or, the UE may identify the scheduling grant for transmission/retransmission of uplink data to be transmitted using a specific preconfigured resource.

According to an embodiment, the configuration information may be UE-specifically indicated to allow the UE to perform uplink transmission using the preconfigured resource. If contention is allowed for the preconfigured resource/resource pool, a collision may occur according to the contention. To process it, the base station may indicate (e.g., transmit, provide) the NPUR-RNTI to the UE through an RRC dedicated message (e.g., RRC release message) when the UE is in the RRC connected state in the cell. The UE may include and transmit the NPUR-RNTI in uplink transmission. Or, the UE may scramble/address uplink data through the NPUR-RNTI and transmit it. Or, the base station may scramble/address, through the NPUR-RNTI, a scheduling grant for uplink transmission/retransmission following the transmission using the preconfigured resource. Or, the base station may scramble/address, through the NPUR-RNTI, a scheduling grant for downlink transmission/retransmission following the transmission using the preconfigured resource. The base station may be set (e.g., configured) to identify what UE has transmitted the uplink data transmitted using a specific preconfigured resource. Or, the UE may identify the scheduling grant for transmission/retransmission of uplink data to be transmitted using a specific preconfigured resource.

Or, the base station may indicate whether to support/allow transmission using the preconfigured resource, in association with the initial uplink BWP. As an example, indication information indicating whether to support/allow transmission using the preconfigured resource in the initial uplink BWP may be provided through the system information of the cell. And/or, information indicating whether to support/allow transmission using the preconfigured resource in the cell may be transmitted through the system information of the cell. The base station may configure a UE-specific initial uplink BWP in the UE through an RRC dedicated message (e.g., RRC release message or RRC reconfiguration message). The base station may provide configuration information for transmission using the preconfigured resource in the UE-specific initial uplink BWP included in the RRC dedicated message. In this case, the base station may support transmission using the preconfigured resource in the cell, but without supporting transmission using the preconfigured resource in the initial uplink BWP through system information, perform transmission using the preconfigured resource in a UE-specifically configured specific uplink BWP. Or, the base station may perform the transmission using the preconfigured resource in a UE-specifically configured specific uplink BWP even when not supporting the transmission using the preconfigured resource in the initial uplink BWP through the system information.

Or, the base station may provide, through the system information, uplink BWP/BWP-lists supporting/allowing transmission using the preconfigured resource differentiated from the initial uplink BWP. For example, if a preconfigured resource is configured, the UE to perform the transmission using the preconfigured resource in the cell may perform the transmission using the preconfigured resource supporting/allowing the transmission using the preconfigured resource differentiated from the initial uplink BWP indicated through the system information. Or, the UE may perform initial access through the uplink BWP supporting/allowing transmission using the preconfigured resource differentiated from the initial uplink BWP indicated through the system information.

Thus, it is possible to flexibly use the transmission band of transmission using the preconfiguration. As an example, the corresponding BWP supporting/allowing the transmission using the preconfigured resource may be the first active BWP configured in the UE or default BWP. As another example, the corresponding BWP may be any BWP having the BWP-ID (or information for identifying the BWP supporting/allowing transmission using the preconfigured resource). As still another example, the corresponding BWP may be a BWP differentiated from the first active BWP, default BWP, or any BWP having the BWP-ID.

The UE may determine whether to allow uplink transmission through the uplink BWP for transmission using the preconfigured resource configured in the UE through the system information. For example, unless the uplink BWP-related information element for transmission using the preconfigured resource configured in the UE is indicated, the UE may perform a normal/common initial access procedure (e.g., initial access through the initial uplink BWP, random access procedure, or RRC connection setup). If the uplink BWP-related information element for transmission using the preconfigured resource configured in the UE is indicated, the UE may perform uplink transmission using the preconfigured resource configured in the UE on the uplink BWP. Or, if transmission using the preconfigured resource for the uplink BWP through the system information is supported/allowed, the UE may perform uplink transmission using the preconfigured resource configured in the UE on the uplink BWP.

When any criterion/condition for triggering/initiating/performing the transmission using the preconfigured resource is executed, the UE may perform an initial access procedure and data transmission through the uplink BWP indicated from the base station and/or associated preconfigured resource. For example, any criterion/condition may include one or more criteria/conditions among having a valid timing alignment, having a valid NPUR configuration, the RSRP of the serving cell not exceeding an RSRP change threshold value, support of transmission of the interest/assistance/subscription information of the UE in the cell, support of transmission using the preconfigured resource in the cell, when the size of the entire available/transmitted uplink data is equal to or smaller than a TBS size (indicated through the system information), and when the size of the MAC PDU including the entire uplink data available/to be transmitted is equal to or smaller than the TBS size (indicated through the system information). If predetermined criterion/condition is not met, the UE may perform a normal/common initial access procedure through the initial uplink BWP.

Or, the UE may perform a normal/common initial access procedure through the initial uplink BWP when the predetermined criterion/condition for triggering/initiating/performing the transmission using the preconfigured resource is not met. Otherwise, the UE may perform the initial access procedure and data transmission through the uplink BWP indicated from the base station and/or the associated preconfigured resource.

Transmission using a preconfigured resource may be configured in association with the initial uplink BWP. The base station may include and transmit the configuration information for preconfigured transmission in an RRC release message for the UE to be able to perform transmission using the preconfiguration in the RRC inactive state. In the typical NR technology, the BWP configuration could be indicated only through system information or RRC reconfiguration message. Typically, the initial BWP was indicated through system information and, to support BWP switching for efficient data transmission in the RRC connected state, it could be indicated through an RRC reconfiguration message. To indicate transmission using the preconfiguration when the UE is in the RRC inactive state, the base station may include initial uplink BWP configuration information (or uplink BWP for data transmission using the preconfigured resource) in the RRC release message and indicate it to the UE. The base station may configure by including preconfigured resource configuration information, as detailed information about the initial uplink BWP configuration information (or uplink BWP for data transmission using the preconfigured resource). The UE-specific initial uplink BWP configuration information (or uplink BWP for data transmission using the preconfigured resource) indicated through the RRC release message may be configured to be differentiated from the cell-specific initial uplink BWP configuration information indicated through the system information.

The transmission using the preconfigured resource may be set to be configured only in the initial uplink BWP. As an example, whether the transmission using the preconfigured resource in the corresponding cell is supported/allowed may be provided through the system information of the cell. The configuration information (corresponding preconfigured resource configuration information) for the UE-specific transmission using the preconfigured resource indicated through the RRC dedicated message (e.g., RRC release message or RRC reconfiguration message) may be limited to be configured only on the initial uplink BWP. Thus, when receiving system information supporting/allowing/enabling transmission using the preconfigured resource in the cell, the UE may perform uplink transmission using the preconfigured resource configured on the initial uplink BWP.

If the UE receives the message including the NPUR configuration information and the corresponding NPUR configuration information is set as setup, the UE may store/(if NPUR configuration information has been configured before) replace the NPUR configuration with the indicated NPUR configuration information. The UE may configure the MAC according to the stored NPUR configuration. Otherwise, if the NPUR configuration information has been configured, the UE releases the NPUR configuration. Or, the UE may discard the NPUR configuration stored before. Or, the higher layer of the UE may indicate to the lower layer that the NPUR configuration has been released.

An Embodiment of Controlling not to Trigger the BSR when Uplink Data Using an Uplink Grant for Transmission Using the Preconfigured Resource is Generated According to the 3GPP TS 38.321 MAC standard, in the typical NR technology, when any of the following events occurs, buffers status reporting (BSR) had to be triggered.
UL data, for a logical channel which belongs to an LCG, becomes available to the MAC entity; and either
this UL data belongs to a logical channel with higher priority than the priority of any logical channel containing available UL data which belong to any LCG; or none of the logical channels which belong to an LCG contains any available UL data,
in which case the BSR is referred below to as 'Regular BSR';
UL resources are allocated and number of padding bits is equal to or larger than the size of the Buffer Status Report MAC CE plus its subheader, in which case the BSR is referred below to as 'Padding BSR';
retxBSR-Timer expires, and at least one of the logical channels which belong to an LCG contains UL data, in which case the BSR is referred below to as 'Regular BSR';
periodicBSR-Timer expires, in which case the BSR is referred below to as 'Periodic BSR'.

For example, when the uplink data belonging to one logical channel group is available to the MAC entity, and the uplink data has a higher priority than the priority of any logical channel including the available uplink data belonging to any logical channel group, or none of the logical channels belonging to the logical channel group have any available uplink data, regular BSR is triggered. In other words, when the MAC entity has available uplink data (uplink data to be transmitted) but available uplink data having a higher priority than the available uplink data is generated or (in a state in which there is no available uplink data) new available uplink data is generated, the regular BSR is triggered. When an uplink resource is allocated, and the size of the padding bit is equal to or larger than the sum of the buffer status report MAC CE and its subheader, the padding BSR is triggered. When retransmission BSR timer expires, and a logical channel belonging to at least one logical channel group includes uplink data, the regular BSR is triggered. When the periodic BSR timer expires, the periodic BSR is triggered.

In particular, as in the example of the first regular BSR trigger, the MAC entity triggers the regular BSR when new available uplink data is generated. Accordingly, if uplink data to be transmitted is generated in the RRC inactive UE for transmission using the preconfigured resource, the MAC entity may trigger the regular BSR and transmit the BSR MAC CE to the base station. Since the regular BSR MAC CE has a higher priority than data from any logical channel (e.g., any user data) except for the UL-CCCH, if the size of the sum of the BSR MAC CE and the uplink data to be transmitted is larger than the transport block of the uplink grant for transmission using the preconfigured resource, the BSR is first sent, so that additional transmission may be triggered. To address this issue, the following method may be used.

As an example, for a logical channel priority procedure, the MAC entity may process the data (data generated from any logical channel or a specific logical channel) with a higher priority than (any or specific) BSR MAC CE when transmission using the preconfigured resource is triggered (by the RRC inactive UE for transmission of uplink data).

As another example, if transmission using the preconfigured resource is triggered (for the RRC inactive UE to transmit uplink data), the MAC entity may not generate (any or specific) BSR MAC CE (to be transmitted to the base station) to perform new transmission (or retransmission) of the data (data generated from any or specific logical channel) (e.g., if the new transmission/retransmission is for an uplink grant using the preconfigured resource).

As further another example, if transmission using the preconfigured resource is triggered (for the RRC inactive UE to transmit uplink data), the MAC entity may not generate (any or specific) BSR MAC CE (to be transmitted to the base station) when newly transmitting the corresponding data (data generated from any or specific logical channel) using MSGA or MSG3 (while being included in MSGA or MSG3).

As still another example, if the transmission using the preconfigured resource is triggered (for the RRC inactive UE to transmit uplink data), the MAC entity may not generate (any or specific) BSR MAC CE (to be transmitted to the base station) when including the corresponding data (data generated from any or specific logical channel) in the RRC message using MSGA or MSG3 (while being included in MSGA or MSG3) and performing new transmission.

Meanwhile, it should be considered that the uplink grant is generated according to the frame structure of NR to support transmission using the preconfigured resource based on NR.

As an example, after the uplink grant for transmission using the preconfigured resource is configured, the MAC entity may sequentially consider the generation of the Nth uplink grant on the symbol as in Equation 1 below.

$$[(SFN \times numberOfSlotsPerFrame \times$$ [Equation 1]

$$numberOfSymbolsPerSlot) +$$

$$(\text{slot number in the frame} \times numberOfSymbolsPerSlot) +$$

$$\text{symbol number in the slot}] =$$

$$[(SFN_{start\ time} \times numberOfSlotsPerFrame \times numberOfSymbolsPerSlot +$$

$$slot_{start\ time} \times numberOfSymbolsPerSlot + symbol_{start\ time}) + N \times periodicity]$$

$$modulo\ (1024 \times numberOfSlotsPerFrame \times numberOfSymbolsPerSlot).$$

In Equation 1, $SFN_{start\ time}$, $slot_{start\ time}$, and $symbol_{start\ time}$ may denote the SFN, slot, and symbol, respectively, for the first transmission occasion/opportunity of the PUSCH where the uplink grant for transmission using the preconfigured resource starts.

As further another example, after the uplink grant for transmission using the preconfigured resource is configured, the MAC entity may sequentially consider the generation of the Nth uplink grant on the symbol as in Equation 2. This may be a scheme considering an uplink grant according to the configured grant type 1 configuration of NR.

$$[(SFN \times numberOfSlotsPerFrame \times$$ [Equation 2]

$$numberOfSymbolsPerSlot) +$$

$$(\text{slot number in the frame} \times numberOfSymbolsPerSlot) +$$

$$\text{symbol number in the slot}] =$$

$$(timeReferenceSFN \times$$

$$numberOfSlotsPerFrame \times numberOfSymbolsPerSlot +$$

$$timeDomainOffset \times numberOfSymbolsPerSlot + S + N \times periodicity)$$

$$modulo(1024 \times numberOfSlotsPerFrame \times numberOfSymbolsPerSlot).$$

where are the SFN, slot, and symbol, respectively, of the first transmission opportunity of PUSCH where the configured uplink grant was (re-)39nitialized.

As still another example, after the uplink grant for transmission using the preconfigured resource is configured, the MAC entity may sequentially consider the generation of the Nth uplink grant on the symbol according to the start time and N*period.

As yet another example, the base station may configure the type among any combinations of the above-described embodiments. The UE receiving the indication information may select and use the type.

As described above, data transmission may be performed efficiently using the preconfigured resource based on the NR radio access network according to the embodiments.

Meanwhile, to transmit uplink data using the above-described preconfigured uplink resource, the UE may provide assistance information to the base station. Or, retransmission for transmission data using the preconfigured uplink resource may be required. Hereinafter, an embodiment of an assistance information transmission and retransmission procedure will be described in greater detail.

As described above, uplink transmission using the preconfigured resource based on LTE according to the related art is for the LTE MTC UE or LTE NB-IoT UE to perform one uplink transmission in the RRC inactive state by using the preconfigured uplink resource without performing a random access procedure. The base station may determine a preconfigured uplink resource configuration based on the UE's subscription information and/or local policy. The UE may indicate, through an RRC message (e.g., PUR configuration request message), that the UE is interested in being configured with the PUR. The UE may include and transmit related information for configuring the PUR in the message. The LTE-based PUR function targeted the LTE MTC UE or LTE NB-IoT UE which a low-power UE, e.g., a meter. The UE performed infrequent transmission of a small amount of data. The UE could transmit an RRC message (e.g., PUR configuration request message) without a special limitation to support the base station's determination of preconfigured uplink resource configuration. If multiple UEs transmit the RRC messages, the load of the base station may increase. Or, to apply uplink transmission using the preconfigured resource to NR-based normal UEs or various NR UEs transmitting a small amount of data (e.g., Traffic from Instant Messaging services, Heartbeat/keep-alive traffic from IM/email clients and other apps, Push notifications from various applications, Traffic from wearable, Industrial wireless sensor network), proper control therefor may be needed. Hereinafter, an efficient providing method will be described.

Indicate Interest/Assistance/Subscription Information to Configure NPUR Regardless of RRC Status In uplink transmission using the preconfigured resource, the UE may transmit an interest/assistance/subscription/related information for PUR configuration through an RRC message (e.g., PUR configuration request message). The message may include information, such as the number of request occasions, request cycle, request TBS, and request time offset. The UE may transmit the message only when in the RRC connected state.

The UE may be not only in the RRC connected state but also in an RRC inactive state/RRC idle state even in which case the UE may transmit the interest/assistance/subscription/related information about transmission using the preconfigured resource without transitioning to the RRC connected state. For example, the RRC inactive UE may transmit, to the base station, the interest/assistance/subscription/related information based on the random access procedure (without RRC connected state transition). The UE may include and transmit the MAC CE in MSGA or MSG3. In the following downlink transmission, the base station may include and transmit the NPUR configuration information to the UE. A MAC CE for indicating the NPUR configuration information may be defined and included. If indicated with the MAC CE, the UE receiving the MAC CE may transfer it to the RRC. The base station may generate NPUR configuration information in the RRC and transfer it to the MAC. The UE may perform transmission using the preconfigured resource in the RRC inactive state.

Or, the RRC inactive UE may transmit, to the base station, the interest/assistance/subscription/related information for NPUR configuration based on the random access procedure (without RRC connected state transition). The UE may include and transmit an RRC request message including the interest/assistance/subscription/related information for NPUR configuration in the MSGA or MSG3. In the following downlink transmission, the base station may include and transmit the NPUR configuration information. An RRC message (e.g., an RRC release message or an RRC reconfiguration message) for indicating NPUR configuration information may be defined. As such, as the RRC message is included and transmitted in the MSGA or MSG3, the RRC inactive UE may perform the preconfigured resource without a state transition.

Indicate Information (e.g., Support/Allow Indication Information or Timer Information) for Limiting Transmission of Interest/Assistance/Subscription Information for Configuring NPUR The base station may receive the UE's interest/assistance/subscription information to configure the preconfigured resource from the UE and/or core network to configure the preconfigured resource in the UE on the associated cell. The base station may receive transmission function support capability information using the preconfigured resource from the UE and/or core network to configure the preconfigured resource in the UE on the associated cell. The interest/assistance/subscription information or capability information may be received from the UE through any uplink L3/L2 message (e.g., RRC message or MAC control element). As another example, the UE may transmit the interest/assistance/subscription information or capability information to the core network entity (e.g., AMF) through any NAS message, and the base station may receive it from the core network entity through an interface (e.g., NG interface) between the core network entity and the base station.

The base station may transmit indication information for controlling/limiting the UE's transmission of interest/assistance/subscription information for configuring the preconfigured resource.

As an example, the base station may transmit, to the UE, information for indicating that the UE allows transmission of the interest/assistance/subscription information in a specific cell. The base station may indicate (e.g., instruct), to the UE, whether to allow/support the UE's transmission of interest/assistance/subscription information for configuring the preconfigured resource through the system information in the cell, thereby controlling the base station to turn on/off and use the corresponding function depending on the radio load. Or, the base station may indicate, to the UE, whether to allow/support the UE's transmission of interest/assistance/subscription information for configuring the preconfigured resource through an RRC dedicated message (e.g., RRC release message) for a specific UE in the cell, thereby controlling the base station to use the function UE-specifically depending on the radio load. When the UE's transmission of the interest/assistance/subscription information in the cell is allowed/supported or when the UE's transmission of the interest/assistance/subscription information is allowed/supported, transmission of the configuration request message including the UE's interest/assistance/subscription information may be initiated/triggered.

As another example, the base station may indicate (e.g., instruct), to the UE, whether to support/allow transmission using the preconfigured resource in a specific cell. The base station may indicate (e.g., instruct), to the UE, whether to support/allow transmission using the preconfigured resource in the cell, controlling the base station to turn on/off and use the corresponding function depending on the radio load. Or, the base station may indicate (e.g., instruct), to the UE, whether to allow/support the transmission using the preconfigured resource through an RRC dedicated message (e.g., RRC release message) for a specific UE in the cell, thereby controlling the base station to use the function UE-specifically depending on the radio load. When transmission using the preconfigured resource in the cell is supported or when transmission using the preconfigured resource of the UE is supported, transmission of the configuration request message including the UE's interest/assistance/subscription information may be initiated/triggered.

As another example, when the UE changes the cell or when any criterion/condition for triggering/initiating/performing the transmission using the preconfigured resource (e.g., having a valid timing alignment, having a valid NPUR configuration, the RSRP of the serving cell exceeding the RSRP change threshold value, non-support of transmission of the interest/assistance/subscription information of the UE in the cell, or non-support of transmission using the preconfigured resource in the cell) is not executed, the base station may allow the UE to release/discard the information.

As another example, the base station may indicate (e.g., provide or transmit), to the UE, timer (value) information for prohibiting transmission of the UE's interest/assistance/subscription information for the UE to configure the NPUR (preconfigured resource). If the UE transmits the UE's interest/assistance/subscription information for configuring the preconfigured resource to the base station (or if transmission of the configuration request message including the UE's interest/assistance/subscription information is initiated/triggered), the timer set with the timer value received from the base station may be started/restarted. When the timer is running, the UE may prohibit (disable) transmission of the UE's interest/assistance/subscription information for configuring the preconfigured resource. When the timer is not running (or expires), the UE may perform/initiate/trigger transmission of the UE's interest/assistance/subscription information for configuring the preconfigured resource.

The above-described indication information for limiting/prohibiting may be provided through system information (e.g., SIB1) of the cell. Or, the indication information may be provided through an RRC dedicated message (e.g., an RRC reconfiguration message for configuring operation in the RRC connected state or RRC release message for configuring the operation of the RRC inactive UE).

An Embodiment of Transmitting UE's Interest/Assistance/Subscription Information Using NR UE Assistant RRC Message If a new RRC message for transmission of the UE's interest/assistance/subscription information for configuring the preconfigured resource over the NR radio access network is defined, the functions as in the above-described embodiments need to be provided to control the transmission of the message. However, if the UE assistance information RRC message predefined in the NR RRC standard is reused, the function may easily be implemented.

The UE assistance information RRC message included in the NR RRC standard included assistance information primarily for reducing the UE's power consumption, such as the UE's delay budget report, overheating assistance information, in-device coexistence, or DRX parameter preference information. The base station may indicate (e.g., provide, transmit) the prohibit timer to the UE for some information included in the UE assistance information RRC message. Upon initiating transmission of the UE assistance information message including the information, the UE may set the prohibit timer associated with the information with the timer value received from the base station and start the timer.

As an example of reusing the UE assistance information RRC message, the UE's interest/assistance/subscription information for configuring the preconfigured resource, transmitted from the UE to the base station, may be transmitted through the UE assistance information message.

In the RRC connected state, the UE capable of transmission using the preconfigured resource (or UE capable of transmission of the UE's interest/assistance/subscription information for configuring the preconfigured resource, for transmission using the preconfigured resource) may transmit the UE's interest/assistance/subscription information for configuring the preconfigured resource to the base station. For example, the UE's interest/assistance/subscription information may be included and transmitted in the RRC reconfiguration message or other configuration information (otherconfig) element of the RRC reconfiguration message. The RRC reconfiguration message or the other configuration information included in the reconfiguration message may include prohibit timer information.

If the UE has been configured to provide the UE's interest/assistance/subscription information for configuring the preconfigured resource, but has not provide the UE's interest/assistance/subscription information since the UE was configured to provide the information, if the one indicated in the last transmission of the UE assistance information message including the UE's interest/assistance/subscription information differs from the current interest/assistance/subscription information of the UE, and the prohibit timer is not operating, the UE may start the timer set with the timer value indicated by the base station. The UE may initiate transmission of the UE assistance information message to the base station.

The UE's interest/assistance/subscription information for configuring the preconfigured resource may include one or more pieces of information as follows.

Number of requests: Number of uplink resource grant occasions using preconfiguration Request cycle: Cycles for uplink resources using preconfiguration Request TBS: TBS for uplink resources using preconfiguration Hereinafter, an additional embodiment for transmission/retransmission using relevant preconfigured resources and parameters for supporting transmission using the preconfigured resource based on NR according to the disclosure will be described.

Add a Parameter for Supporting Transmission Using the Preconfigured Resource Based on NR The configuration information for transmission using the preconfigured resource may be provided through an RRC message (e.g., RRC release message). Upon receiving the message, the UE may store configuration information for transmission using the preconfigured resource. The transmission using the preconfigured resource may be one for performing one transmission in the RRC inactive state. Accordingly, one UE may be configured with one preconfigured resource on the BWP including the preconfigured resource or on the cell indicating the configuration.

The preconfigured resource configuration information may include one or more pieces of information among the following pieces of information to efficiently use the base station resource.

Uplink grant information using preconfigured uplink resources: may include one or more pieces of information among, e.g., time domain offset (e.g., offset of the resource for SFN=0 or reference SFN in the time domain), time reference SFN (which indicates the SFN used to determine the offset of the resource in the time domain), time domain allocation information (e.g., start symbol and length and combination of mapping table types), and frequency domain allocation information (e.g., information specified in TS 38.212 7.3.1).

Information on the Number of Times/Duration/Valid Time/Valid Period/Number of Occasions Using Preconfigured Uplink Resources Number of empty occasions using contiguous preconfigured uplink resources before implicit release: If the preconfigured resource is not used continuously, it is desirable to release the configuration. In this case, the UE and the base station may implicitly release the corresponding configuration without signaling.

MCS (Modulation and Coding Scheme) and TBS: The Modulation Order, Target Code Rate and TB Size Periodicity: A transmission period using a preconfigured uplink resource and may be configured with a value identified for each subcarrier spacing.

Feedback for transmission or RNTI for retransmission: RNTI for receiving an uplink grant for transmission/retransmission and/or NACK (e.g., HARQ NACK, L1 NACK, or NACK through DCI) from the base station, on the uplink transmission using the preconfigured resource. That is, it may mean the above-described NPUR-RNTI.

Number of repeated transmissions to indicate (e.g., instruct) repeated transmission of one TB transmission in the uplink grant using a bundle of preconfigured resources: it is a value that may be smaller than (or equal to) the number of occasions using the preconfigured resource. Or, it is a value that may be smaller than the number of empty occasions using the contiguous preconfigured uplink resources before the implicit release.

Response timer (for transmissions using preconfiguration): Transmission using the preconfiguration may be performed for one uplink transmission when the UE is in the RRC inactive state. Therefore, it is not desirable to continuously monitor the feedback (e.g., HARQ ACK/NACK, L1 ACK/NACK, or ACK/NACK through DCI) for the corresponding transmission like in the RRC connected state. Accordingly, the UE (UE's MAC entity) may monitor the PDCCH identified by the NPUR-RNTI to receive the feedback (e.g., HARQ ACK/NACK, L1 ACK/NACK, or ACK/NACK through DCI) for the transmission during a predetermined duration/period/time after the transmission using the preconfiguration (transmission using the uplink grant for transmission using the preconfiguration). The UE may set the response timer with the received value and start it after the transmission using the preconfiguration. The UE may perform the above-described operation regardless of occurrence of a possible measurement gap. For example, the UE may perform the operation in the serving cell without performing interfrequency measurement although a measurement gap occurs.

Retransmission timer (for transmissions using preconfiguration): it may indicate duration/period/time after performing transmission/retransmission using the preconfiguration (in the HARQ process). As an example, during the duration/period/time, (autonomous/periodic) retransmission through the HARQ process may not be performed. As another example, the PDCCH identified by the NPUR-RNTI may be monitored to receive a feedback (e.g., HARQ ACK/NACK, L1 ACK/NACK, or ACK/NACK through DCI) for the transmission/retransmission after the transmission/retransmission. The UE may set the retransmission timer with the received value and start/restart it after transmission/retransmission using the preconfiguration.

Beta offset information about UCI (e.g., HARQ feedback, CSI reports) transmission on PUSCH: when an offset value for determining the resource for HARQ-ACK multiplexing and CSI report multiplexing in the PUSCH specified in TS 38.213 9.3 is defined, it may be (pre) configured to apply a beta offset, as another example, a semi-static beta offset value to uplink transmission using the preconfigured uplink resource.

Dedicated HARQ process/HARQ process ID: a dedicated HARQ process for performing transmission using preconfiguration may be preconfigured, fixed to the UE, or be indicated by the base station.

In the case of LTE, to receive a response/acknowledge/feedback for the transmission using the preconfigured resource, the UE should monitor the PDCCH in the window by using a response window timer after transmission using the preconfigured resource. Thus, the base station may indicate an uplink grant for retransmission for the transmission using the preconfigured resource through the PDCCH. Or, the base station may indicate L1 acknowledge information (L1 ACK) for transmission using the preconfigured resource through the PDCCH. In this case, the MAC entity may start 4 subframes after the end of the PUSCH transmission. In LTE, since 4 ms is fixedly used from uplink transmission to downlink reception, it is preferable to start after 4 subframes. In contrast, in NR, since the limitation may be mitigated, it is preferable that the MAC entity starts the response window at the first PDCCH occasion from the end of the PUSCH transmission. Accordingly, the MAC entity may start the response window at the first PDCCH occasion from the end of the PUSCH transmission, or the base station may control the UE's MAC entity to configure the first PDCCH occasion from the end of the PUSCH transmission. For example, the base station may indicate (e.g., provide, transmit), to the UE, offset information until PDCCH is monitored after the transmission using the preconfigured resource. The UE (MAC entity) may start the response window at the first PDCCH occasion after the offset from the end of the PUSCH transmission. The offset information may be indicated (e.g., provided, transmitted) through system information or may be indicated UE-specifically through an RRC dedicated message.

When the UE performs transmission using the preconfigured resource, the transmission may fail. The UE may perform retransmission through one or more of the following methods.

According to an embodiment, the UE may receive the uplink grant addressed/indicated by the above-described NPUR-RNTI and perform retransmission. The base station may indicate retransmission through HARQ information performing the transmission (e.g., New Data Indicator (NDI), Transport Block size (TBS), Redundancy Version (RV), and HARQ process ID). As an example, when NDI is set to 1, the UE may consider that the NDI is not toggled for the HARQ process. The UE may stop the above-described response timer (for transmission using the preconfiguration). The UE may start/restart the retransmission timer for transmission using the preconfiguration (for the HARQ process) when transmission/retransmission is performed. The UE may monitor the PDCCH identified by the NPUR-RNTI to receive a feedback (e.g., HARQ ACK/NACK, L1 ACK/NACK, or ACK/NACK through DCI) for the transmission/retransmission when transmission/retransmission is performed. As another example, when NDI is set to 1, the UE may consider that the NDI is not toggled for the HARQ process. The UE may start/restart the above-described response timer (for transmission using the preconfiguration). If the above-described retransmission timer does not operate, the UE may perform retransmission for the transmission (through the HARQ process). The UE may start/restart the retransmission timer for transmission using the preconfiguration (for the HARQ process) when transmission/retransmission is performed. The UE may control not to perform retransmission (through the HARQ process) for the transmission while the above-described retransmission timer operates.

As another example, retransmission may be provided through repetition of the configuration (uplink grant) for transmission using the preconfigured resource. The base station may indicate (e.g., provide, transmit, inform), to the UE, the above-described number of repeated transmissions to indicate repeated transmission of one TB transmission in the uplink grant using a bundle of preconfigured resources. When the number of repeated transmissions is larger than 1, the number of repetitions-1 HARQ retransmissions may be followed after initial/first transmission. As an example, upon failing to receive any acknowledge (ACK) signal from the base station, the UE may perform retransmission by number of repetitions-1 after the initial transmission. The UE may start/restart the response timer for transmission using the preconfiguration (for the HARQ process) when transmission/retransmission is performed. The UE may monitor the PDCCH identified by the NPUR-RNTI to receive a feedback (e.g., HARQ ACK/NACK, L1 ACK/NACK, or ACK/NACK through DCI) for the transmission/retransmission when transmission/retransmission is performed. Upon receiving any acknowledge (ACK) signal from the base station, the UE may stop the response timer for transmission using the preconfiguration. Upon receiving any acknowledge (ACK) signal from the base station, the UE may stop the retransmission timer (for transmission using the preconfiguration). As another example, upon failing to receive any acknowledge (ACK) signal from the base station, the UE may perform retransmission by number of repetitions-1 after the initial transmission. The UE may start/restart the above-described response timer (for transmission using the preconfiguration). If the above-described retransmission timer does not operate, the UE may perform retransmission for the transmission (through the HARQ process). The UE may start/restart the retransmission timer for transmission using the preconfiguration (for the HARQ process) when transmission/retransmission is performed. The UE may control not to perform retransmission (through the HARQ process) for the transmission while the above-described retransmission timer operates.

As another example, when a configuration (uplink grant) for transmission using the preconfigured resource is indicated to the UE, if failing to receive any acknowledge (ACK) signal from the base station until the above-described response timer (for transmission using the preconfiguration) expires after the initial/first transmission, or until the retransmission timer (for transmission using the preconfiguration) expires, the UE may perform retransmission at the occasion/uplink grant using the next preconfigured uplink resource. The UE may monitor the PDCCH identified by the NPUR-RNTI to receive a feedback (e.g., HARQ ACK/NACK, L1 ACK/NACK, or ACK/NACK through DCI) for the transmission/retransmission when transmission/retransmission is performed. The UE may start/restart the above-described response timer (for transmission using the preconfiguration). The UE may start/restart the above-described retransmission timer (for transmission using the preconfiguration).

According to the above-described embodiments, the UE may efficiently perform retransmission even when failing to receive an ACK signal for the data transmitted using the preconfigured uplink resource.

Hereinafter, hardware and software configurations of a UE and a base station capable of performing the above-described embodiments will be described with reference to the drawings.

Figure 14:
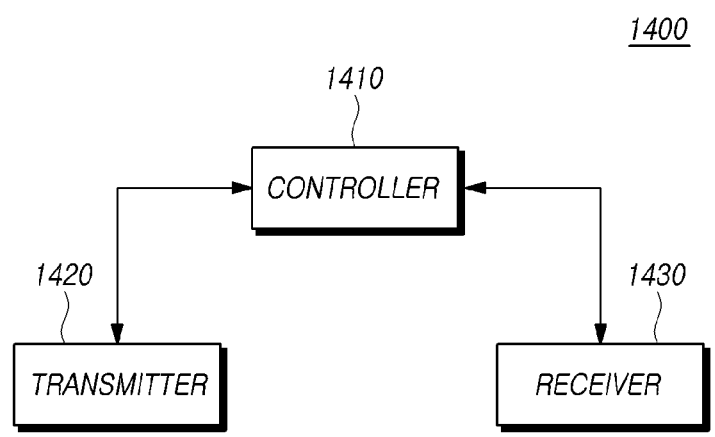
FIG. 14 is a block diagram illustrating a UE according to an embodiment.

FIG. 14 is a block illustrating a UE according to an embodiment.

Referring to FIG. 14, a UE 1400 transmitting uplink data includes a transmitter 1420 for transmitting, to a base station, assistance information for transmitting uplink data using a preconfigured uplink resource and a receiver 1430 for receiving, from the base station, configuration information for transmitting the uplink data using the preconfigured uplink resource. The transmitter 1420 may transmit uplink data through the preconfigured uplink resource set based on configuration information.

According to an embodiment, the assistance information may include various information requested by the UE in transmitting uplink data using the preconfigured uplink resource. For example, the assistance information may include information, such as the number of request occasions, request cycle, request TBS, and request time offset. The assistance information may be transmitted to the base station through an RRC message or MSGA or MSG3 transmitted during a random access procedure.

The assistance information may be indicated (e.g., provided, transmitted) by different logical channels according to the RRC state of the UE. For example, the assistance information may be indicated through a transport channel by different logical channels according to the RRC state of the UE. For example, when the UE is in the RRC IDLE state or RRC INACTIVE state, assistance information may be indicated (e.g., provided, transmitted) through a common control channel (CCCH). As another example, when the UE is in the RRC connected state, the assistance information may be indicated (e.g., provided, transmitted) through a dedicated control channel (DCCH).

According to an embodiment, the configuration information may be received through a dedicated RRC message. As an example, the configuration information may be included and received in an RRC release message. Or, the configuration information may be included and received in an RRC reconfiguration message.

The configuration information may include parameters necessary for the UE to transmit uplink data using the preconfigured uplink resource. For example, the configuration information may include various pieces of information, such as preconfigured uplink radio resource (frequency, time resource) information, UE-specific RNTI information, uplink data transmission trigger condition information using the preconfigured uplink resource, and bandwidth part information.

Meanwhile, the configuration information may be set in association with the bandwidth part. For example, the bandwidth part where the preconfigured uplink resource is set may be set as a dedicated bandwidth part differentiated from the initial uplink bandwidth part set in the UE. Or, the bandwidth part associated with the preconfigured uplink resource may be an initial uplink bandwidth part set in the UE. The bandwidth part where the preconfigured uplink resource is set may be indicated (e.g., informed or noticed) to the UE through an RRC release message.

If uplink transmission is triggered with the preconfigured uplink resource configured in the UE, the transmitter 1420 may transmit uplink data to the base station using the configured preconfigured uplink resource.

According to an embodiment, whether to transmit uplink data using the preconfigured uplink resource may be determined based on condition information that may be included in the above-described configuration information. As an example, when uplink data is transmitted using the preconfigured uplink resource, transmission of the buffer status information (BSR) may be set not to be triggered.

Further, the receiver 1430 may further receive indication information for indicating whether transmission of assistance information is allowed through the system information. For example, the receiver 1430 may receive, through the system information, the indication information for indicating whether transmission of the assistance information for using the preconfigured uplink resource is allowed. The indication information may include information for controlling/limiting the UE's interest/assistance/subscription information for configuring the preconfigured uplink resource. As an example, the indication information may include information for indicating that the UE allows transmission of the interest/assistance/subscription information in a specific cell. As another example, the indication information may include information about whether to support/allow transmission using the preconfigured uplink resource in the specific cell. As another example, the indication information may include a timer value for prohibiting transmission using the preconfigured uplink resource. The indication information may further include various pieces information described above.

The transmitter 1420 may retransmit uplink data upon failing to receive an acknowledge signal for uplink data from the base station.

For example, upon failing to receive an ACK signal from the base station when transmitting the uplink data using the preconfigured uplink resource, the UE may be able to perform retransmission. In this case, retransmission of uplink data may be performed on the next preconfigured uplink resource occasion on the time axis. In other words, retransmission may be performed on the next preconfigured uplink resource occasion of the preconfigured uplink resource.

Further, in the data transmission method necessary to perform the above-described embodiment, the controller 1410 controls the overall operation of the UE 1400 according to transmission or retransmission of data using the bandwidth part on the preconfigured uplink resource by the UE in the RRC inactive state or RRC idle state.

The transmitter 1420 and the receiver 1430 are used to transmit or receive signals or messages or data necessary for performing the above-described embodiments, with the base station.

Figure 15:
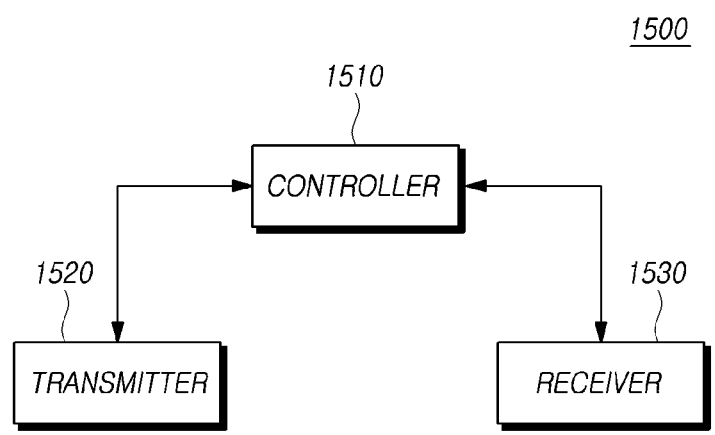
FIG. 15 is a block diagram for describing a base station according to an embodiment.

FIG. 15 is a block diagram for illustrating a base station according to an embodiment.

Referring to FIG. 15, a base station 1500 controlling transmission of uplink data of a UE may include a receiver 1530 for receiving, from the UE, assistance information for transmitting uplink data using a preconfigured uplink resource and a transmitter 1520 for transmitting, to the UE, configuration information for transmitting the uplink data using the preconfigured uplink resource based on the assistance information. The receiver 1530 may receive the uplink data through the preconfigured uplink resource set based on the configuration information from the UE.

According to an embodiment, the assistance information may include various information requested by the UE in transmitting uplink data using the preconfigured uplink resource. As an example, the assistance information may include information, such as the number of request occasions, request cycle, request TBS, and request time offset. The assistance information may be received through an RRC message or MSGA or MSG3 received during a random access procedure.

The assistance information may be indicated (e.g., provided, transmitted) through different logical channels according to the RRC state of the UE. For example, the assistance information may be indicated through a transport channel by different logical channels according to the RRC state of the UE. For example, when the UE is in the RRC IDLE state or RRC INACTIVE state, assistance information may be indicated through a common control channel (CCCH). As another example, when the UE is in the RRC connected state, the assistance information may be indicated through a dedicated control channel (DCCH).

The configuration information may be transmitted through a dedicated RRC message. As an example, the configuration information may be included and transmitted in an RRC release message. Or, the configuration information may be included and transmitted in an RRC reconfiguration message.

The configuration information may include parameters necessary for the UE to transmit uplink data using the preconfigured uplink resource. For example, the configuration information may include various pieces of information, such as preconfigured uplink radio resource (frequency, time resource) information, UE-specific RNTI information, uplink data transmission trigger condition information using the preconfigured uplink resource, and bandwidth part information.

Meanwhile, the configuration information may be set in association with the bandwidth part. For example, the bandwidth part where the preconfigured uplink resource is set may be set as a dedicated bandwidth part differentiated from the initial uplink bandwidth part set in the UE. Or, the bandwidth part associated with the preconfigured uplink resource may be an initial uplink bandwidth part set in the UE. The bandwidth part where the preconfigured uplink resource is set may be indicated to the UE through an RRC release message.

If uplink transmission is triggered with the preconfigured uplink resource configured in the UE, the UE may transmit uplink data to the base station using the configured preconfigured uplink resource. In this case, the receiver 1530 may receive, from the UE, uplink data through the preconfigured uplink resource set in each UE.

Meanwhile, the transmitter 1520 may transmit indication information for indicating whether transmission of assistance information is allowed through the system information. For example, the transmitter 1520 may transmit, through the system information to the UE, the indication information for indicating whether transmission of the assistance information for using the preconfigured uplink resource is allowed. The indication information may include information for controlling/limiting the UE's interest/assistance/subscription information for configuring the preconfigured uplink resource.

As an example, the indication information may include information for indicating that the UE allows transmission of the interest/assistance/subscription information in a specific cell. As another example, the indication information may include information about whether to support/allow transmission using the preconfigured uplink resource in the specific cell. As another example, the indication information may include a timer value for prohibiting transmission using the preconfigured uplink resource. The indication information may further include various pieces information described above. The indication information may be transmitted through system information, e.g., SIB1, or through a dedicated RRC message.

Further, upon receiving uplink data through the preconfigured uplink resource, the transmitter 1520 may transmit feedback information therefor to the UE. Further, upon receiving no feedback information or feedback information indicated as NACK, the UE may retransmit uplink data. Accordingly, the receiver 1530 may receive the retransmitted uplink data.

Further, in the data transmission method necessary to perform the above-described embodiment, the controller 1510 controls the overall operation of the base station 1500 according to transmission or retransmission of data using the bandwidth part on the preconfigured uplink resource by the UE in the RRC inactive state or RRC idle state.

The transmitter 1520 and the receiver 1530 are used to transmit or receive signals or messages or data necessary for performing the above-described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

The invention claimed is:

1. A method for transmitting uplink data by a user equipment (UE), the method comprising:
   receiving, from the base station, configuration information for transmitting the uplink data using a preconfigured uplink resource;
   transmitting the uplink data through the preconfigured uplink resource set based on the configuration information; and
   upon failing to receive an acknowledge signal for the uplink data from the base station, retransmitting the uplink data,
   wherein the preconfigured uplink resource is configured in configured grant type 1, and wherein the configuration information includes a retransmission timer for transmission of the uplink data.

2. The method of claim 1, wherein the configuration information includes at least one of initial uplink bandwidth part information for transmission of the uplink data and a parameter for transmitting the uplink data using the preconfigured uplink resource, and the configuration information is received through an RRC release message.

3. The method of claim 1, wherein when transmission or retransmission of the uplink data is performed according to the configuration information, the retransmission timer starts or restarts.

4. The method of claim 1, wherein the retransmission of the uplink data is performed without an indication from the base station before the retransmission timer expires.

5. The method of claim 4, wherein the retransmission of the uplink data is performed at an occasion of a next preconfigured uplink resource on a time axis.

6. A method for controlling transmission of uplink data of a user equipment (UE) by a base station, the method comprising:
   transmitting, to the UE, configuration information for transmitting the uplink data using a preconfigured uplink resource;
   receiving, from the UE, the uplink data through the preconfigured uplink resource set based on the configuration information; and
   upon failing to receive the uplink data, receiving retransmission for the uplink data from the UE,
   wherein the preconfigured uplink resource is configured in configured grant type 1, and wherein the configuration information includes a retransmission timer for transmission of the uplink data.

7. The method of claim 6, wherein the configuration information includes at least one of initial uplink bandwidth part information for transmission of the uplink data and a parameter for transmitting the uplink data using the preconfigured uplink resource, and the configuration information is transmitted through an radio resource control (RRC) release message.

8. The method of claim 6, wherein the retransmission of the uplink data by the UE is performed without an indication from the base station before the retransmission timer expires.

9. A user equipment (UE) for transmitting uplink data, comprising:
   a receiver configured to receive, from a base station, configuration information for transmitting uplink data using a preconfigured uplink resource; and
   a transmitter configured to transmit the uplink data through the preconfigured uplink resource set based on the configuration information, wherein the transmitter retransmits the uplink data upon failing to receive an acknowledge signal for the uplink data from the base station,
   wherein the preconfigured uplink resource is configured in configured grant type 1, and wherein the configuration information includes a retransmission timer for transmission of the uplink data.

10. The UE of claim 9, wherein the configuration information includes at least one of initial uplink bandwidth part information for transmission of the uplink data and a parameter for transmitting the uplink data using the preconfigured uplink resource, and the configuration information is received through an RRC release message.

11. The UE of claim 9, wherein when transmission or retransmission of the uplink data is performed according to the configuration information, the retransmission timer starts or restarts.

12. The UE of claim 9, wherein the retransmission of the uplink data is performed without an indication from the base station before the retransmission timer expires.

13. The UE of claim 12, wherein the retransmission of the uplink data is performed at an occasion of a next preconfigured uplink resource on a time axis.

* * * * *